United States Patent [19]

Cavalier et al.

[11] Patent Number: 5,102,698
[45] Date of Patent: Apr. 7, 1992

[54] PROCESS FOR OBTAINING AN ARTICLE MADE OF A CARBON-CONTAINING COMPOSITE MATERIAL PROTECTED AGAINST OXIDATION

[75] Inventors: Jean-Claude Cavalier, Le Pian Medoc; Alain Nale, Saint Romain La Virvee, both of France

[73] Assignee: Societe Europeenne De Propulsion, Suresnes, France

[21] Appl. No.: 451,738

[22] Filed: Dec. 15, 1989

[30] Foreign Application Priority Data

Dec. 20, 1988 [FR] France .................... 8816862

[51] Int. Cl.⁵ .................................. B05D 3/02
[52] U.S. Cl. ......................... 427/376.1; 427/294; 427/376.2; 427/397.8; 427/419.1; 427/419.7; 428/289; 428/367; 428/368; 428/389; 428/408; 501/88
[58] Field of Search .......... 427/294, 376.1, 376.2, 427/397.7, 397.8, 419.1, 419.7; 428/245, 260, 365, 408, 698, 378, 367, 368, 289, 389, 446; 501/88, 154

[56] References Cited

U.S. PATENT DOCUMENTS

| | | | |
|---|---|---|---|
| 4,252,588 | 2/1981 | Kratsch et al. | 156/89 |
| 4,471,023 | 9/1984 | Shuford | 427/397.8 |
| 4,559,270 | 12/1985 | Sara | 427/397.8 |
| 4,567,103 | 1/1986 | Sara | 427/376.2 |
| 4,585,675 | 4/1986 | Shuford | 427/376.2 |
| 4,830,919 | 5/1989 | Shuford | 501/88 |
| 4,863,773 | 9/1989 | Rosseau et al. | 428/408 |
| 4,911,992 | 3/1990 | Haluska et al. | 427/376.2 |
| 4,923,578 | 5/1990 | Benton et al. | 204/130 |
| 4,976,899 | 12/1990 | Rosseau et al. | 427/397.7 |

FOREIGN PATENT DOCUMENTS

| | | | |
|---|---|---|---|
| 1287764 | 1/1969 | Fed. Rep. of Germany | 427/376.2 |
| 52-52135 | 4/1977 | Japan | 427/397.8 |
| 55-167156 | 12/1980 | Japan | 427/397.8 |

*Primary Examiner*—Michael Lusignan
*Assistant Examiner*—Terry J. Owens
*Attorney, Agent, or Firm*—Weingarten, Schurgin, Gagnebin & Hayes

[57] ABSTRACT

A process is provided for obtaining an article which is made of a carbon-containing composite material and which is protected against oxidation. The composite material, which is obtained by densifying a porous fibrous texture with a matrix and which exhibits a residual internal porosity, is impregnated under a vacuum with an alkaline compound in a liquid solution. The article is dried and heat-treated at a temperature sufficient to cause the alkaline compound to line the surfaces of the internal pores, thereby constituting the residual porosity and forming a continuous auto-cicatrizing internal protective coating. An additional external protective layer comprised of a wear- and oxidation-resistant material may be applied.

12 Claims, No Drawings

PROCESS FOR OBTAINING AN ARTICLE MADE OF A CARBON-CONTAINING COMPOSITE MATERIAL PROTECTED AGAINST OXIDATION

BACKGROUND OF THE INVENTION

1. Field of the Invention

The present invention relates to the anti-oxidation protection of products in composite materials containing carbon.

2. Prior Art

The composite materials known as thermostructural materials are used for producing pieces which are required to show good thermomechanical properties, particularly in the spacial, aeronautical or braking fields. These materials are formed by a refractory fibrous reinforcement, such as in carbon or ceramics, densified by a matrix, which may also be in carbon or ceramics.

For applications implying keeping the pieces at high temperature in an oxidizing medium, the composites with a ceramic matrix may be preferred to the composites with a carbon matrix because of the poor resistance of carbon to oxidation.

Nevertheless, an anti-oxidation protection remains necessary for composites with ceramic matrix when these contain carbon. This is the case with carbon-ceramic type composites in which the fibrous reinforcement is in carbon, such as the C—SiC (carbon-silicon carbide) composites. It is also the case with ceramic-ceramic type composites, such as SiC—SiC (silicon carbide-silicon carbide) comprising an interphase layer of pyrolytic carbon between the fibers and the matrix, as described in U.S. Pat. No. 4,752,503.

The anti-oxidation protection of thermostructural composites has been the subject of much research.

One known solution consists in forming on the piece in composite material, a coating resistant to wear and to oxidation, generally a coating in silicon carbide (SiC) using the chemical vapor deposition technique.

In practice, however, it is impossible to produce such an external coating without faults appearing either during production (defects in the form of pin-holes), or when the product is used (cracks). The composite material then is not thoroughly isolated from the ambient oxidizing medium.

To eliminate these faults, it has been proposed to provide an additional coating in a material such as borate- or borosilicate-type glass which, by passing through a paste state at a certain temperature, stops the holes and cracks in the SiC coating.

Another known solution consists in providing an internal type protection by chemical vapor deposition of boron within the residual porosity of the composite material, as described in U.S. Pat. No. 4,582,751.

SUMMARY OF THE INVENTION

It is the object of the present invention to provide a process which will further improve the anti-oxidation protection of a product in a composite material containing carbon.

This object is reached according to the invention with a process which comprises the steps of:

carrying out an impregnation treatment in order to thoroughly incorporate to the core of the open residual porosity of the product, at least a liquid solution of an alkaline compound capable of leaving, after a heat treatment, a non-oxidizing and auto-cicatrizing refractory residue, drying the impregnated product, and subjecting the impregnated and dried product to a heat treatment with a view to forming on the surfaces of the open pores of the composite material an internal protection coating constituted by said refractory residue.

Preferably, the product comprising the internal protection is provided with a superfical coating layer in a material resistant to wear and oxidation, such as for example, silicon carbide, chromium carbide or a ceramic material, which constitutes an external refractory protection coating. Said coating is formed on the surface of the product and also within the open residual porosity, at least close to the surface. The effect of the anchoring of the external protection in the superficial porosity of the product is to lock the internal protection in position.

Impregnation is achieved by means of a liquid solution of an alkaline compound, particularly a sodium, potassium or lithium compound, which leaves a non-oxidizing refractory residue having the characteristics required, in particular those of auto-cicatrizing, in the field of application proposed for the product. By auto-cicatrizing is meant here the possibility which the refractory residue has of forming an internal protection without faults due to its ability to soften in a certain range of temperatures, the softening filling up any holes or cracks which may have appeared in the internal protection and in the subjacent material.

Impregnation is carried out, at least initially, in vacuum, in order to allow the evacuation of the gases filling the porosity of the product. The impregnation-in-vacuum phase may be completed by an impregnation-under-pressure phase whose object will be to force the liquid solution to fill to the core the whole porosity of the product.

Preferably, the impregnation of composite materials designed to be used at relatively high temperatures, is performed with a liquid solution of alkaline silicate, such as sodium silicate or potassium silicate.

A sodium silicate liquid solution may, depending on the respective proportions of $SiO_2$ and $Na_2O$, allow the formation of a refractory residue having a softening point of 1100° C. Such an internal protection coating, preferably associated to an external protection coating, affords an efficient anti-oxidation protection under high temperatures of use, reaching up to 1450° C. for example in the case of SiC-SiC composites with pyrolytic carbon interphase, this being the maximum temperature at which this type of composite material can be used.

In addition, the internal protection coating can then quite easily tolerate the formation, by chemical vapor deposition, of an external protection coating in silicon carbide, which deposition is normally performed at a temperature of about 1000° C.

Liquid solutions of potassium silicate may also be used, the softening point of the refractory residue obtained after heat treatment being between 700° C. and 1100° C., depending on the relative proportions of $SiO_2$ and $K_2O$.

It is also worth noting that there are liquid solutions of sodium and potassium silicates which exhibit a relatively low viscosity permitting good penetration to the core of the porosity of the composite material during impregnation. Particularly suitable liquid solutions are, a liquid sodium silicate sold under the denomination "7N34" by the French company Rhône-Poulenc, having the typical composition of 25.8% $SiO_2$, 7.7% $Na_2O$ and 66.3% $H_2O$, a liquid potassium silicate sold under the denomination "7K23" by the same company, and having a typical composition of 23.2% $SiO_2$, 10% $K_2O$ and 66.8% $H_2O$, or a liquid potassium silicate sold under the denomination "7K19" also by the same company, and having a typical composition of 27.2% $SiO_2$, 14.6% $K_2O$ and 58% $H_2O$.

Other liquid solutions of alkaline compounds may also be used, particularly an aqueous solution of alkaline metaphosphate, such as sodium metaphosphate, which, after a heat treatment, leaves an internal protection efficient against oxidation within a temperature range of 600° C. and 700° C. for example, for C—C and C—SiC type composites, and up to a temperature of at least 850° C. reaching even up to 1050° C. for SiC—SiC type composites with pyrolytic carbon interphase. A solution of lithium aluminosilicate would also be suitable.

Impregnation is performed, at first at least, in vacuum by immersion of the composite material products in a bath of the liquid solution of the selected alkaline compound, inside an enclosure under reduced pressure, for example about 30 torrs ($4.10^3 N/m2$). Immersion is continued for a certain time, for example one hour. The impregnation-in-vacuum phase may be followed by an impregnation-under-pressure phase the purpose of which is to complete the incorporation of the solution to the core of the accessible porosity. After a return to the atmospheric pressure, the products may be brought out of the bath, and drained before being dried. The impregnated and dried products are then subjected to a heat treatment by progressive raising of the temperature up to a value approaching, if not slightly exceeding the softening point of the solid residue of the impregnation solution. The heat treatment has a "spreading" effect leading to the formation of a continuous and substantially uniform internal protection layer over the surface of the open pores of the composite material. A further effect of the heat treatment is to make the internal coating moisture-proof.

After cooling, the products may be coated with an external protection layer of a wear- and oxidation-resistant material, such as silicon carbide, chromium carbide or any other refractory ceramic. The external protection may be obtained by chemical vapor deposition as long as the deposition temperature necessary is compatible with the internal protection material and with the composite material. For example, in the case of an external protection coating in silicon carbide formed by chemical vapor deposition, the deposition is carried out in such a way as to obtain a coating of several micrometers thickness, for example between 30 and 100 $\mu$m. By penetrating at least in the superficial porosity of the product, the external protection anchors itself and thus locks the internal protection in position. The techniques of chemical vapor deposition of silicon carbide and other ceramic materials are well known and need not be described herein in detail. Other conventional deposition techniques can be used, such as, for example, spray-diffusing of a mixture of a binder and a powder of the material constituting the external protection.

Efficiency of the anti-oxidation protection afforded by the process according to the invention is shown in the examples described hereinafter. All said examples concern composite materials with ceramic matrix, and especially those with SiC matrix, which are more particularly meant to be used at relatively high temperatures, such uses being a preferential field of application for the process according to the invention. Such materials generally have an open residual porosity of at least 10% volumewise.

EXAMPLE 1

A product in composite material of SiC—SiC type with pyrolytic carbon interphase is produced according to a process comprising the following steps:

formation of a fibrous reinforcement texture by stacking layers of fabric in fibers essentially in silicon carbide such as the fibers sold under the denomination "NICALON" by the Japanese company, Nippon Carbon Co, chemical vapor infiltration of an intermediate coating of carbon on the fibers of the layers of fabric which are held by tools, and chemical vapor infiltration of a matrix of silicon carbide to the core of the porosity of the reinforcement provided with the pyrolytic carbon interphase.

Such a process is described in detail in U.S. Pat. No. 4,752,503.

The product is subjected to a treatment against oxidation comprising a first step of impregnation in vacuum with a liquid solution of sodium silicate such as that sold under the reference "7N34" by the French company Rhône-Poulenc. The impregnation is carried out by immersing the product in a bath of the sodium silicate solution under a pressure of about 30 torrs ($4.10^3 N/m2$) for about one hour. After return to the atmospheric pressure, draining and drying, the product is subjected to a heat treatment lasting several hours in a neutral atmosphere ($N_2$), which heat treatment consists in raising progressively the temperature to about 1050° C. and, staying at that temperature before returning to the ambient temperature, so as to produce a "spreading" of the internal protection coating and to make the silicate almost completely insensitive to moisture.

The anti-oxidation protection may be completed by the formation of an external surface coating in silicon carbide by chemical vapor deposition, the thickness of the coating being equal to about 50 $\mu$m, and the superficial coating forming an external protection anchored in at least the superficial porosity of the product.

The tensile strength ($R_T$) in the plane of the layers of fabric of the reinforcement, was measured on the product in composite material, without anti-oxidation protection, with only the sodium silicate-based internal protection, and with the sodium silicate-based internal protection and the SiC external protection, before and after ageing in the air, in different conditions of duration, temperature and cycling (successive heating and cooling phases). Table 1 hereunder regroups the results obtained. For a better simulation of the conditions of use, the product was, in certain cases, pre-stressed: pre-stressing of 80 to 100 MPa under tensile strength and 90 to 130 MPa under flexural strength, which causes the formation of microcracks inside the composite material.

TABLE 1

| Internal protection | External protection | Pre-stressing | Ageing under air | $R_T$(MPa) |
|---|---|---|---|---|
| No | No | No | | 200 |
| No | No | No | 50 hrs at 700° C. | 60 |
| Yes | No | No | 50 hrs at 700° C. | 200 |
| No | No | No | 100 hrs at 850° C. | 100 |
| Yes | No | No | 100 hrs at 850° C. | 200 |
| Yes | Yes | No | 500 hrs at 850° C. | 200 |

TABLE 1-continued

| Internal protection | External protection | Pre-stressing | Ageing under air | R_T(MPa) |
|---|---|---|---|---|
| Yes | No | Yes | 100 hrs at 850° C. | 200 |
| Yes | Yes | Yes | 500 hrs at 850° C. | 200 |
| Yes | No | No | 100 cycles 20-750° C. | 200 |
| Yes | Yes | Yes | 100 cycles 20-850° C. (Total duration 20 hrs) | 200 |
| Yes | No | Yes | 300 hrs at 850° C. (with thermomechanical cycling) | 200 |
| Yes | Yes | No | 100 hrs at 1200° C. | 180 |
| Yes | No | No | 20 hrs at 1450° C. | 180 |

The results given in Table I clearly show the efficiency of the finishing treatment without which the SiC-SiC material would be completely unusable in an oxidizing atmosphere at high temperature.

The efficiency of the treatment is illustrated inside an extremely wide range of temperature, reaching up to 1450° C., i.e. a temperature higher to that generally admitted for the limit of use of the SiC "NICALON" fiber.

The efficiency of the treatment is also proved, not only in static ageing conditions, but also during thermal cycles, including on prestressed, hence microcracked materials, after completion of the anti-oxidation protection.

Another factor to be noted is the excellent moisture-proofness of the product provided with the internal protection resulting from the heat-treatment, the efficiency of the protection being entirely preserved after the product has been immersed in water at 95° C. for 30 minutes, or placed inside an air-conditioned vapour-bath at 50° C. with a relative humidity of 95% for 24 hours.

EXAMPLE 2

A product in C—SiC type composite material is produced according to a process comprising the following steps:

formation of a fibrous reinforcement texture by stacking of multidirectional layers (felts) in carbon fibers and needling of the layers as they are stacked, and chemical vapor infiltration of an intermediate coating of carbon on the fibers of the reinforcement texture, chemical vapor infiltration of a matrix of silicon carbide through to the core of the porosity of the fibrous carbon reinforcement.

The product is thereafter subjected to an anti-oxidation protection treatment, as described in Example 1. The resistance to oxidation is evaluated by measuring the weight loss during a test of ageing in the air. It is considered that weight loss should not exceed 2% if the C—SiC composite is to retain 80% of its mechanical properties. The results obtained are given in Table 2 hereunder and particularly emphasize the efficiency of the protection.

TABLE 2

| Internal protection | External protection | Ageing in the air | Weight loss during age-hardening |
|---|---|---|---|
| No | No | 30 mins at 900° C. | 13% |
| Yes | No | 30 mins at 900° C. | 1.5 |
| No | No | 1 hr at 1200° C. | 22.6% |
| Yes | Yes | 1 hr at 1200° C. | 1% |
| No | No | 4 hr at 1200° C. | 34% |
| Yes | No | 4 hr at 1200° C. | 1.4% |
| Yes | Yes | 40 hrs at 1200° C. | 2% |

EXAMPLE 3

A product in C—SiC type composite material is produced according to an anti-oxidation protection process comprising the following steps:

formation of a fibrous reinforcement texture by stacking of layers of fabric in carbon fibers, and chemical vapor infiltration of an intermediate coating in carbon on the fibers of the fabric layers held by tools, chemical vapor infiltration of a matrix in silicon carbide through to the core of the porosity of the reinforcement texture which is held by tools.

The product is subjected to an anti-oxidation protection treatment as described in Example 1, and the resistance to oxidation is evaluated by measuring the weight loss during ageing as in Example 2. The results obtained are given in Table 3 hereunder.

TABLE 3

| Internal protection | External protection | Ageing under air | Weight loss during ageing |
|---|---|---|---|
| No | No | 20 mins at 1550° C. | 2.8% |
| No | No | 3 × 20 mins (cycle) at 1550° C. | 10% |
| Yes | Yes | 20 mins at 1550° C. | 0% |
| Yes | No | 3 × 20 mins (cycle) at 1550° C. | 0.15% |
| Yes | Yes | 3 × 20 mins (cycle) at 1550° C. | 0.06% |
| Yes | No | 8 × 20 mins (cycle) at 1550° C. | 1% |
| Yes | yes | 8 × 20 mins (cycle) at 1550° C. | 1% |

EXAMPLE 4

A product in SiC-SiC type composite material with pyrolytic carbon interphase is produced as indicated in Example 1, and is then subjected to an anti-oxidation protection treatment with a view to forming an internal protection layer containing sodium metaphosphate.

To this effect, the product is impregnated in vacuum with an aqueous solution of sodium metaphosphate of $Na(PO_3)_n$ composition. The impregnation is carried out by immersing the product in a bath of said aqueous solution under a pressure of about 30 torrs ($3.10^2 N/m2$) for about one hour. After return to the atmospheric pressure, draining and drying, the product is subjected to a heat treatment lasting several hours by progressive rising of the temperature to about 1050° C., then staying at that temperature in order to "spread" the internal protection coating.

The resistance of the product to oxidation is evaluated by measuring the tensile strength ($R_T$) as in Example 1. The results obtained are given in Table 4 hereafter. These results show the efficiency of the protection afforded by the internal coating of sodium metaphosphate.

TABLE 4

| Internal protection | Prestressing | Ageing under air | R_T(MPa) |
|---|---|---|---|
| Yes | No | No | 200 |
| No | No | 50 hrs at 700° C. | 60 |

TABLE 4-continued

| Internal protection | Prestressing | Ageing under air | $R_T$(MPa) |
|---|---|---|---|
| Yes | No | 50 hrs at 700° C. | 200 |
| No | No | 100 hrs at 850° C. | 100 |
| Yes | No | 100 hrs at 850° C. | |
| Yes | Yes | 100 hrs at 850° C. | 150 |
| Yes | Yes | 500 hrs at 850° C. | at |
| Yes | Yes | 100 cycles at 850° C. | 200 |

EXAMPLE 5

A product in C-SiC type composite material produced as indicated in Example 3 is provided with an internal anti-oxidation protection in sodium metaphosphate as described in Example 4.

The resistance of the product to oxidation is evaluated by measuring the weight loss and the tensile strength $R_T$. The results obtained are given in Table 5 hereunder.

TABLE 5

| Internal protection | Ageing under air | Weight loss under ageing | $R_T$(MPa) |
|---|---|---|---|
| No | No | 0% | 300 |
| No | 17 hrs at 600° C. | 10 | 75 |
| Yes | 50 hrs at 600° C. | 0% | 300 |

What is claimed is:

1. A process for obtaining an article made of a carbon-containing composite material and protected against oxidation, said process comprising the steps of:
   providing an article of a carbon-containing composite material having an internal residual porosity accessible from an outer surface of the article;
   impregnating the article under vacuum with a liquid solution comprising an alkaline compound to cause said liquid solution to penetrate to the core of the residual porosity of the composite material, said liquid solution characterized by the ability to leave a non-oxidizing and autocicatrizing refractory residue after a heat treatment;
   drying the impregnated article; and
   heat treating the impregnated and dried article to a temperature sufficient to form a refractory residue lining the surfaces of the pores constituting said residual porosity, whereby a continuous and substantially uniform auto-cicatrizing and moisture resisting internal protection coating of said refractory residue is formed on the surfaces of said pores.

2. The process of claim 1 wherein in said impregnating step said article is impregnated with a liquid solution comprising a compound of an alkaline element selected from the group consisting of sodium, potassium, and lithium.

3. The process of claim 1 wherein in said impregnating step said article is impregnated with a liquid solution comprising sodium silicate.

4. The process of claim 1 wherein in said providing step said article of a carbon-containing composite material includes a ceramic matrix.

5. The process of claim 1 wherein said step of providing an article of carbon-containing composite material comprises
   providing a material of fibrous texture,
   coating fibers of said material of fibrous texture with a pyrolytic carbon interphase layer, and
   forming a ceramic matrix within said coated material of fibrous texture.

6. A process for obtaining an article made of a carbon-containing composite material and protected against oxidation, said process comprising the steps of:
   providing an article of a carbon-containing composite material having an internal residual porosity accessible from an outer surface of the article;
   impregnating the article under a vacuum with a liquid solution comprising an alkaline compound to cause said liquid solution to penetrate to the core of the residual porosity of the composite material, said liquid solution characterized by the ability to leave a non-oxidizing and auto-cicatrizing refractory residue after a heat treatment;
   drying the impregnated article;
   heat treating the impregnated and dried article to a temperature sufficient to form a refractory residue lining the surfaces of the pores constituting said residual porosity, whereby a continuous and substantially uniform auto-cicatrizing moisture resisting internal protection coating of said refractory residue is formed on the surfaces of said pores; and
   coating the article with an external protection layer comprising a wear- and oxidation-resistant external protection material, said layer penetrating at least the superficial porosity of the heat-treated article.

7. The process of claim 6 wherein in said coating step the external protection layer consists of silicon carbide.

8. The process of claim 6 wherein in said coating step the external protection layer is formed by chemical vapor deposition.

9. The process of claim 6 wherein in said impregnating step the article is impregnated with a liquid solution comprising a compound of an alkaline element selected from the group consisting of sodium, potassium, and lithium.

10. The process of claim 6 wherein in said impregnating step the article is impregnated with a liquid solution of sodium silicate.

11. The process of claim 6 wherein in said providing step said carbon-containing composite material includes a ceramic matrix.

12. The process of claim 6 wherein in said providing step said carbon-containing composite material includes a pyrolytic carbon interphase formed on fibers of the material by a ceramic matrix.

* * * * *